(12) United States Patent
Moliton et al.

(10) Patent No.: US 7,800,827 B2
(45) Date of Patent: Sep. 21, 2010

(54) METHOD OF MANUFACTURING AN OPHTHALMIC LENS FOR PROVIDING AN OPTICAL DISPLAY

(75) Inventors: Renaud Moliton, Charenton-le-Pont (FR); Hervé Cado, Charenton-le-Pont (FR); Gérard Martin, Charenton-le-Pont (FR)

(73) Assignee: Essilor Int'l (Compagnie Generale D'Optique), Charenton-le-Pont ( * ) Notice: Subject to any disclaimer, the term of this patent is extended or adjusted under 35 U.S.C. 154(b) by 217 days.

(21) Appl. No.: 11/630,287

(22) PCT Filed: Jul. 12, 2005

(86) PCT No.: PCT/FR2005/050574

§ 371 (c)(1),
(2), (4) Date: Jan. 31, 2008

(87) PCT Pub. No.: WO2006/016086

PCT Pub. Date: Feb. 16, 2006

(65) Prior Publication Data

US 2008/0273246 A1    Nov. 6, 2008

(30) Foreign Application Priority Data

Jul. 16, 2004 (FR) .................................. 04 07902

(51) Int. Cl.
*G02B 27/14* (2006.01)
(52) U.S. Cl. ........................................ 359/633; 264/1.1
(58) Field of Classification Search ................ 359/633; 351/159, 177; 264/1.1
See application file for complete search history.

(56) References Cited

U.S. PATENT DOCUMENTS

| 5,960,550 | A | * | 10/1999 | Weir et al. ..................... 33/28 |
| 6,356,392 | B1 | | 3/2002 | Spitzer ...................... 359/630 |
| 6,554,421 | B1 | * | 4/2003 | Billard et al. ................. 351/41 |
| 2001/0033401 | A1 | | 10/2001 | Kasai et al. ................... 359/15 |
| 2002/0036751 | A1 | * | 3/2002 | Tanijiri et al. ............... 351/244 |
| 2003/0057577 | A1 | | 3/2003 | Primel et al. ................. 264/1.7 |
| 2004/0085649 | A1 | | 5/2004 | Repetto et al. ............. 359/633 |

FOREIGN PATENT DOCUMENTS

WO    WO0079327    12/2000

OTHER PUBLICATIONS

International Search Report- Dec. 5, 2005.

* cited by examiner

*Primary Examiner*—Joseph Martinez
*Assistant Examiner*—James R Greece
(74) *Attorney, Agent, or Firm*—Sofer & Haroun, LLP

(57) ABSTRACT

The invention relates to a method of manufacturing a vision correction lens that has a front face and a rear face, and into which light beams emitted by an optical element of a light beam generator system are introduced via an entry surface and directed towards the eye of the wearer to enable information content to be viewed, said light beams being reflected a plurality of times between two "reflection" faces between being introduced into the lens and exiting therefrom, said two reflection faces being faces of a transparent optical insert constituted by a light guide. According to the invention, said insert is completely contained within the lens.

9 Claims, 4 Drawing Sheets

METHOD OF MANUFACTURING AN OPHTHALMIC LENS FOR PROVIDING AN OPTICAL DISPLAY

RELATED APPLICATIONS

The present application is a national phase application of PCT/FR2005/050574, which in turn claims the benefit of priority from French Patent Applications No. 04 07902, filed on Jul. 16, 2004, the entirety of which are incorporated herein by reference.

FIELD OF THE INVENTION

The present invention relates to a method of manufacturing an ophthalmic lens for making an optical display by means of an optical imager designed to allow information of the image or multimedia type to be projected. The term "lens" is used herein to designate an optical system suitable in particular for being positioned in a frame for spectacles or eyeglasses.

BACKGROUND OF THE INVENTION:

U.S. Pat. No. 5,886,822 discloses making an ophthalmic lens that presents a projection insert. Such a projection insert is constituted by an optical imager for shaping the light beams coming from an electronic and optical system for generating light beams based on an electronic signal, the system being of the miniature screen, laser diode, or light-emitting diode (LED) type. The optical imager directs the light beams towards the wearer's eye to enable the information content to be viewed.

That prior art optical imager includes a propagation prism, a counter-prism, a quarterwave plate, and a spherical Mangin mirror. The spherical Mangin mirror is a plano-spherical lens on which the spherical face has been made reflective by means of treatment with aluminum or the equivalent.

The imager also includes polarization separation treatment that can be implemented by depositing thin layers, either on the propagation prism, or on the counter-prism, or by means of a film bonded between those two elements.

The imager may be embedded in a lens by molding as described in patent document FR 2 828 743.

By causing optical beams to propagate parallel to the plane of the lens accompanied by reflection at 45°, such a projection insert presents thickness that is relatively large, assuming it is desired for the apparent size of the projected image to be sufficiently large and acceptable. This goes against obtaining a lens fitted in this way that also serves to correct vision. Given the curved correcting surfaces at the front and the rear of an ophthalmic lens and given the curvatures that depend on the vision correction to be provided, the overall thickness of the lens becomes unacceptable.

U.S. Pat. No. 6,384,982 proposes a display in which the light beams emitted by an optical element of a light beam generation system are introduced via an entry surface and directed towards the eye of the wearer so as to enable information content to be viewed, the light beams being reflected a plurality of times between two "reflection" faces between their entry into and their exit from the lens, said two reflection faces being faces of a transparent optical insert constituted by a light guide.

U.S. Pat. No. 6,474,809 also discloses making an ophthalmic display in which a reflective holographic element is provided in the lens or between two half-lenses. Both faces of the lens are then reflective and the light beams reflect thereon a plurality of times before reaching the holographic elements where they are directed towards the eye of the user.

Although those types of display enable a lens to be obtained of smaller thickness, they raise a problem of achieving a compromise between the display function and the vision correction function. The faces of the lens are involved in both functions, so for example it is impossible to change the radius of curvature of one face for vision-correction reasons without disturbing the display function. If they are also required to correct the user's vision, such ophthalmic displays can therefore be made in bespoke manner only. In practice, such displays thus cannot be reasonably adapted to a vision-correcting lens.

OBJECTS AND SUMMARY OF THE INVENTION

The invention solves this problem by providing a method of manufacturing an ophthalmic display that can also correct the vision of a user, while being mass-produced in reliable manner, with this being achieved by decoupling the display and the vision-correction functions.

To this end, the invention provides a method of manufacturing a vision-correction lens that has a front face and a rear face, and into which light beams emitted by an optical element of a light beam generator system are introduced via an entry surface and directed towards the eye of the wearer to enable information content to be viewed, said light beams being reflected a plurality of times between two "reflection" faces, between being introduced into the lens and exiting therefrom, said two reflection faces being faces of a transparent optical insert constituted by a light guide, the method being characterized in that said insert is completely contained within the lens.

The term "lens" is used herein to mean a finished lens ready for placing on a spectacles frame, or an unfinished lens or lens blank, i.e. that still needs to be subjected to at least one treatment, e.g. surfacing, in order to be usable.

Such a lens blank possesses the properties of an ophthalmic intermediate, i.e. its rear face and/or its front face in this unfinished state do not present any particular optical function but needs to be surfaced, i.e. blanked and polished, in order to obtain a finished ophthalmic lens with the wearer's prescription for viewing the surroundings.

By means of the invention, the essential function of propagating and shaping the light beams is performed by the optical insert, while the essential function of correcting vision is performed by the lens having appropriate front and rear faces.

All of the treatments performed on an ophthalmic lens, e.g. anti-reflection treatment, anti-dirtying treatment, or sun-screen tinting by pigments, can be performed without disturbing the display function since the functions are decoupled.

It is possible to use an optical insert of small thickness, about 3 millimeters (mm).

In a preferred implementation, said insert is placed in said lens while it is being molded in a mold comprising a first mold portion for molding said front face, and a second mold portion for molding said rear face.

Most advantageously, said entry surface is formed by making a molded cavity in the lens, and it constitutes the bottom of said cavity.

According to a specific characteristic, said cavity is molded by means of a stud secured to the second mold portion, and said insert is temporarily secured to said stud prior to molding.

Preferably, said stud is placed on a lateral edge of said second portion.

Advantageously, said lens is obtained by molding a monomer.

And preferably, said insert is secured temporarily to said stud prior to molding by means of a layer of said monomer.

Said second mold portion may include micromarking for positioning and identification purposes.

The invention also provides a finished lens ready to be positioned on a frame, or else a lens blank, i.e. still needing at least one treatment, e.g. surfacing treatment, so as to make it usable, and obtained by the method as specified above.

Finally, the invention provides an ophthalmic display including such a lens.

BRIEF DESCRIPTION OF THE DRAWINGS

The invention is described with below in greater detail with the help of figures that show merely a preferred embodiment of the invention.

DETAILED DESCRIPTION

Figure 1:
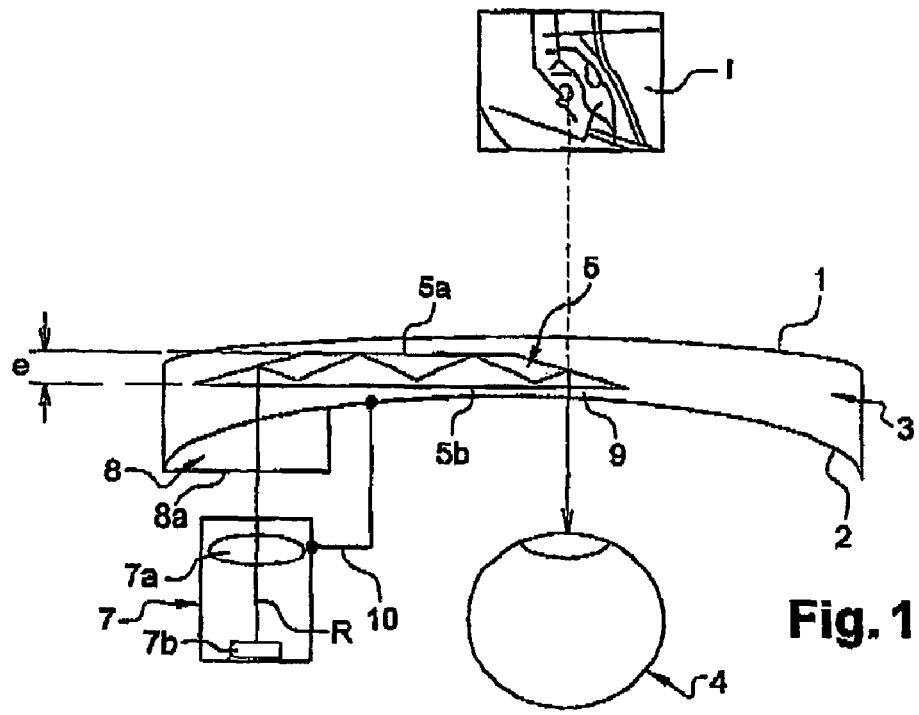
FIG. 1 is a section view of a display including a lens, constituting a first variant embodiment.

With reference to FIG. 1, an electronic signal carrying information is delivered to a miniature screen 7b by a cable (not shown). From this signal, the miniature screen 7b, which is back-lighted, generates an image made up of pixels corresponding to the information. The screen 7b is associated with an optical device 7a. The light beam generator system 7 formed by the screen and the optical device is positioned relative to a lens 3 by means of a mechanical interface 10. A protective shell generally protects all or part of the assembly.

The light beam as represented by the path of the principal ray R is thus directed towards the lens 3 and penetrates therein via an entry surface 8a associated with the lens 3. This entry surface 8a and the path of the principal ray R are substantially perpendicular.

The entry surface 8a is formed by an insertion piece 8 fitted on the rear face 2 of the lens 3 and secured for example by adhesive. This surface 8a may be made, for example, by optical-quality surfacing in order to procure all of the characteristics needed for obtaining a good image.

The light beams are directed towards the wearer's eye 4 to enable information content I to be viewed. To do this, they are reflected several times between two reflection faces 5a and 5b between said entry surface and their exit from the lens in an exit zone 9 of small thickness.

These two reflection faces are faces of an isolator optical insert 5 that is completely contained within the lens 3 and is constituted by a transparent light guide presenting a trapezoidal section with acute angles of less than 45°, parallel to the light beam transmission direction.

Figure 2:
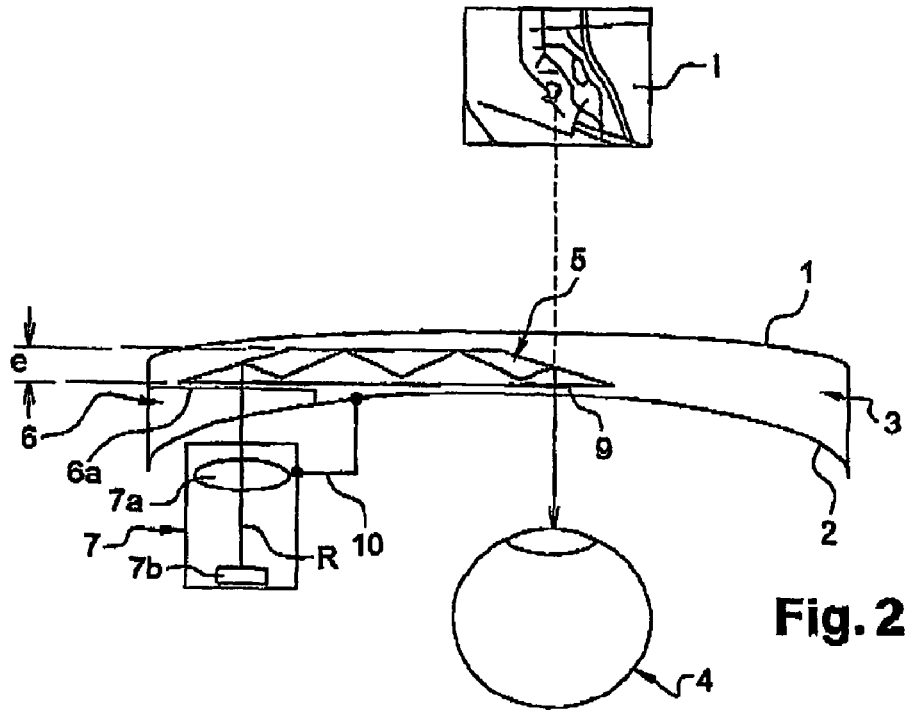
FIG. 2 is a section view of a display including a lens, in a second variant embodiment.

FIG. 2 differs from FIG. 1 solely in how the entry surface associated with the lens 1 is made.

In this example the entry surface is obtained by forming a cavity 6 in the lens, with the bottom surface 6a thereof forming said entry surface for light beams. This surface 6a can be made by molding, in order to procure all of the characteristics needed for obtaining a good image. Optionally, the molding operation may be followed by a surfacing operation of optical quality.

The cavity 6 may be as shown in FIG. 2, being made in the thickness of the lens and being of a height that is less than the height of the lens.

It may also consist of a facet made by removing a small thickness of the lens, and it may be surfaced over the full height of the lens.

Figure 3:
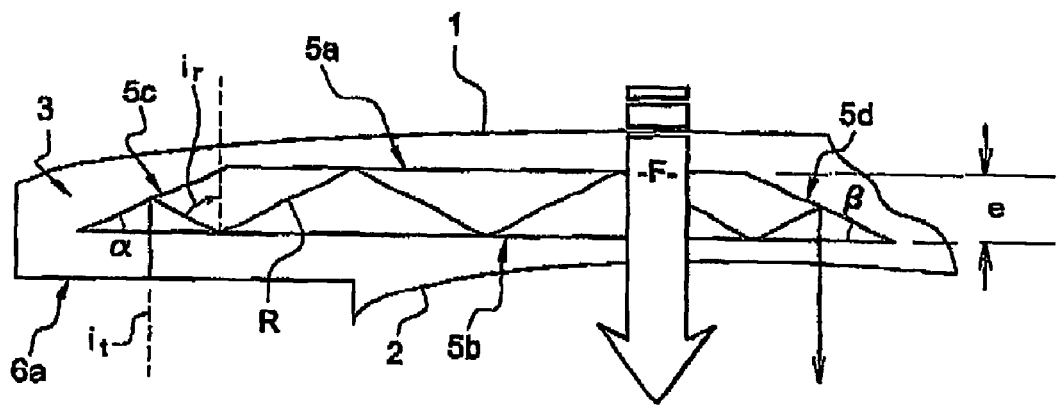
FIG. 3 is a detail view in section of a display including a lens, in said second variant embodiment.

This second variant embodiment is shown in section and in greater detail in FIG. 3, which serves essentially for describing the isolator insert 5.

As mentioned above, by means of the invention, the lens 3 performs both vision-correction and display functions.

Concerning the function of propagating and shaping light beams, this is provided essentially by the optical insert 5 along which the light beams represented by the trajectory of the principal ray R in FIG. 3 propagate entirely. These beams are subjected therein to a plurality of reflections between the two faces 5a and 5b of the insert 5. This makes it possible to obtain an insert 5 of minimized thickness e, and consequently to have a correcting lens or glass that is likewise of small thickness, while procuring light-beam shaping properties and also enabling the information content I to be enlarged and properly positioned.

Concerning the vision-correction function, the front and rear faces 1 and 2 of the lens 3 are machined in known manner to procure the desired correction, and the insert 5 is of transparent material so as to ensure that the surroundings are clearly visible through the lens and through the insert. Furthermore, in terms of appearance, the presence of the insert in the lens is invisible or practically invisible.

More precisely, after the light beam has been shaped by the light beam generator system 7 by virtue of the miniature screen 7b and the associated optical device 7a (which device may provide a portion of the magnification and positioning function on the information image), the light beam then passes through the entry surface 6a which optimizes its transfer to the inside of the lens 3.

The optical insert 5 is constituted by a light guide in the form of a rhombohedral prism presenting a trapezoidal section with acute angles α and β that are less than 45°, and extending parallel to the light beam transmission direction.

This insert is made of a transparent material, a mineral glass, or a plastics material, having a refractive index that is substantially equal to that of the material constituting the lens over the entire visible spectrum. This serves to eliminate undesirable prismatic effects and to minimize the extent to which the isolator optical insert can be seen.

The insert comprises:

two reflection faces 5a and 5b which are plane and parallel, on which the light beams are reflected;

a reflecting plane face 5c inclined at an angle α that is less than 45° relative to the two above-mentioned reflecting faces 5a and 5b and serving to deflect the light beams so that they propagate along the guide constituted by the isolator optical insert 5; and a reflecting plane face 5d that is inclined at an angle β of less than 45° relative to the two above-mentioned parallel reflecting faces 5a and 5b and that serves as a combiner for directing the light beams towards the user's eye.

The reflecting faces may be obtained by a semitransparent mirror treatment or they may be constituted by aluminum or silicon dioxide, by applying multi-layer treatment to obtain a stack of thin layers, e.g. by vacuum deposition, or else made as a holographic optical element.

The object of isolating multilayer treatment is to confine the propagation of the light beams of the information imaging path to the inside of the optical insert contained in the lens.

As an example embodiment, the lens 3 may be constituted using the plastics material known under the trademark "MR6" sold by Mitsui and having the following refractive indices n in the visible range:
  at 480 nanometers (nm): n=1.605185
  at 546.1 nm: n=1.59779
  at 589.3 nm: n=1.59422
  at 643.8 nm: n=1.5899 and for the material of the isolator optical insert, it is possible to use the plastics material known under the trademark "STIM8" sold by Ohara and having refractive indices n in the visible spectrum that are approximately as follows:
  at 480 nm: n=1.60711
  at 546.1 nm: n=1.59911
  at 589.3 nm: n=1.594538
  at 643.8 nm: n=1.59173

Furthermore, the face 5b of the insert close to the rear face of the lens is subjected to isolator treatment ensuring that this surface 5b can be passed through by the light beam entering the insert 5 after passing through the entry surface 6a, while also reflecting the same light beam after it has been reflected on the inclined face 5c or on the large parallel face 5a.

Since the principal ray is the light ray coming from the center of the miniature screen and propagating through the system to strike the pupil of the eye in its center, this isolator treatment ensures very high transmission of light beams for angles of incidence that are close to the angle of incidence $i_t$ of the principal ray on the first face 5b that it passes through on entering into the isolator optical insert. Advantageously, as shown in FIG. 3, this angle of incidence at entry is substantially equal to a normal angle of incidence, i.e. the angle $i_t$ is zero.

In contrast, this isolator treatment ensures a very high degree of reflection, greater than 80%, for the principal ray on the same surface 5b for angles of incidence close to the angle of incidence $i_r$ of said ray after its first reflection on the inclined reflecting surface 5c.

Such isolator treatment is transparent to avoid disturbing the vision of the user through the lens, as represented by arrow F in FIG. 3, since it is transparent close to normal incidence.

Advantageously, the other large reflection face 5a is made using the same isolator treatment.

The isolator treatment may be implemented by means of a thick hologram operating in reflection, or by means of special multilayer treatment.

An example of such special multilayer isolator treatment is described below with reference to FIG. 4.

Figure 4:
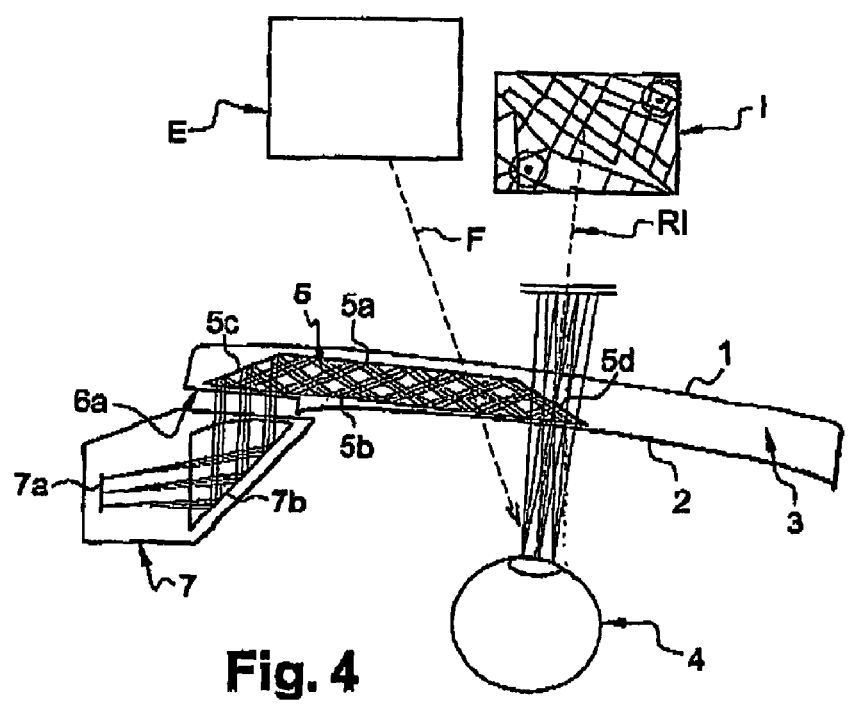
FIG. 4 is a section view of a display including a lens, in another variant embodiment.

FIG. 4 shows another embodiment. Elements in common with the above figures are given the same references.

In this figure, the optical element 7b associated with the miniature screen 7a is a prismatic lens having one of its surfaces arranged to reflect light.

A plurality of light beams are represented, and the direction of the principal ray RI of the information light path pointing to the center of the virtual information image, known as the information viewing direction, is also shown.

There can also be seen a diagram of the image E of the surroundings as seen by the wearer. An arrow F represents the light rays coming from said surroundings and reaching the wearer's eye by passing through the isolator optical insert.

A multilayer treatment, i.e. a stack of a variety of thin layers of different materials, i.e. materials having different refractive indices, is thus deposited on the surfaces of the large reflection faces 5a and 5b.

Such treatments present properties that change depending on the angle of incidence and the polarization of the light. Account needs to be taken of this when designing and optimizing the treatment.

Overall, it can be considered that light beam propagation in the overall system, and in the isolator insert 5 in particular, takes place within a cone having extreme angles that depend on the apparent size of the image perceived by the wearer, i.e. the field of vision.

For an optical system as shown in FIG. 4, where the field of vision is 10°, for which the combiner 5d and the first inclined reflecting surface 5c are both constituted by aluminum-coated mirrors, the variation of the angle of incidence $i_t$ in transmission and the angle of incidence $i_r$ in reflection is substantially equal to half the field of vision, i.e. substantially equal to 5°.

When the combiner 5d is constituted by a holographic optical element, this variation in the angle of incidence $i_t$ in transmission and in the angle of incidence $i_r$ in reflection is no longer exactly equal to half the field of vision. Nevertheless, when the holographic optical element is of power that is low relative to the lens 7a of the beam generator system 7, this variation is very close to half the field of vision.

In any event, using optical calculation software such as "code V" from Optical Research Associates, the range of variation in the angle of incidence $i_r$ on the large reflection faces 5a and 5b can be determined regardless of the power of the combiner 5d and regardless of the overall optical combination used for overall shaping of the information path.

In the example given below, consideration is given to a mirror type combiner 5d and it is also considered that this variation in the angle of incidence $i_r$ in reflection is ±5°, thus corresponding to a field of vision for the information lens of 10°.

It is also considered that the miniature screen emits light with rectilinear polarization, with polarization S for the incidence on these large reflection faces 5a and 5b. The polarization S is perpendicular to the plane of incidence on these faces.

In the context of this optical combination as shown in FIG. 4, the angles α and β are equal to each other, being 30°, and the angle of incidence in reflection on the large reflection faces 5a and 5b lies between an angle $i_r$ of 60° plus or minus 5°, i.e. an angle $i_r$ lying in the range 55° to 65°. The number of reflections on the large reflection faces 5a and 5b is also large, and more precisely there are five such reflections in this example.

In the context of this example, the incidence is normal, i.e. the angle $i_t$ is equal to 0°.

The transmission of the system is thus given by:

$$T\text{system}(\lambda)=Rs[5a](i_r)^{E(N/2)} \cdot Rs[5b](i_r)^{N-E(N/2)} \cdot T(i_r)^2(\lambda) \cdot Rs[5c](\lambda) \cdot Rs[5d](\lambda)$$

Considering that the isolator treatments are identical, this gives:

$$T\text{system}(\lambda)=Rs[5a](i_r)^N(\lambda) \cdot T(i_r)^2(\lambda) \cdot Rs[5c](\lambda) \cdot Rs[5d](\lambda)$$

in which:

$\lambda$ is wavelength;

$Rs[5a](i_r)(\lambda)$ is the spectral reflectance of the multilayer treatment 5a for the angle of incidence $i_r$ and the polarization S;

$T(i_r)(\lambda)$ is the spectral transmittance of the multilayer treatment 5a for the angle of incidence $i_r$;

$Rs[5c](\lambda)$ is the spectral reflectance of the reflecting treatment 5c for the corresponding angle of incidence (in this example equal to $\alpha$) and polarization S;

$Rs[5d](\lambda)$ is the spectral reflectance of the combiner 5d for the corresponding angle of incidence and polarization S; and N is the total number of reflections on the faces of the guide 5a and 5b.

The losses at the lens-air interface are ignored. It can be assumed that they are in fact minimal by applying an anti-reflection treatment of the kind that is conventional in ophthalmic optics.

It should be observed that $Rs[5c](\lambda) \cdot Rs[5d](\lambda)$ is independent of the problem of how the isolator should be treated.

Thus, when designing the stack of thin layers, it is possible to consider the following reduced equation for maximizing:

$$T\text{reduced}(\lambda)=Rs[5a]^N(\lambda) \cdot T(i_r)^2(\lambda)$$

This means that to maintain good transmission, it is necessary for the reflectance Rs to be high, preferably greater than 80%-90% in the visible range. Thus, $Rs^5$ is greater than 30%. At very least, Treduced($\lambda$) is selected to be greater than 30% for all wavelengths in the visible spectrum, and greater than 50% for most of them, in particular around the sensitivity peak of the spectral photopic response of the eye that is situated around 555 nm. Advantageously, it is as high as possible.

Furthermore, the visual transmission $\tau v$ (isolator) of the lens through the isolator optical insert for through vision must be as high as possible. $\tau v$ (isolator) is defined as being the result of passing through the two large reflectance faces 5a and 5b. Its value is calculated from the curve $T(i_r)^2(\lambda)$ and from the D65 illuminant and the photopic sensitivity of the eye in application of the standards laid down by the CIE (Commission Internationale de l'Eclairage).

Advantageously, the value of $\tau v$ (isolator) is greater than 90% over the visible range.

It is then appropriate to optimize the following value:

the spectral reflection value S over the visible range from 400 nm to 700 nm for angles of incidence $i_r$=55°, 60°, and 65°;

the value of spectral transmission at normal incidence over the visible spectrum; and the value of the visible transmission fraction $\tau v$ defined using the CIE standards on the basis of the D65 illuminant and the photopic sensitivity of the eye.

To do this, a stack of thin layers is designed so as to satisfy the performance criteria given above while using any suitable software, for example the "Essential MacLeod" software package.

Figure 5:
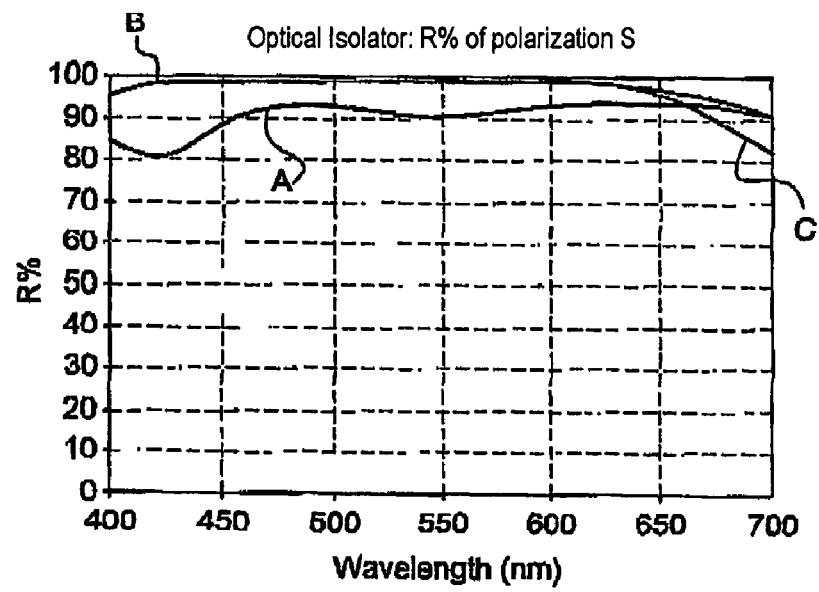
FIG. 5 is a graph showing the spectral reflectance of an isolator insert forming part of a lens, reflectance being plotted as a function of wavelength.

By way of example, with a stack of nine layers as specified in the table below, spectral reflectance Rs for the isolator insert is obtained that is greater than 80% over the visible range and greater than 90% at a wavelength substantially equal to 500 nm, as shown in the graph of FIG. 5. In the graph, spectral reflectance Rs is plotted in a curve A for angles of incidence of 55°, in a curve B for angles of incidence greater than 60°, and in a curve C for angles of incidence greater than 65°.

Figure 6:
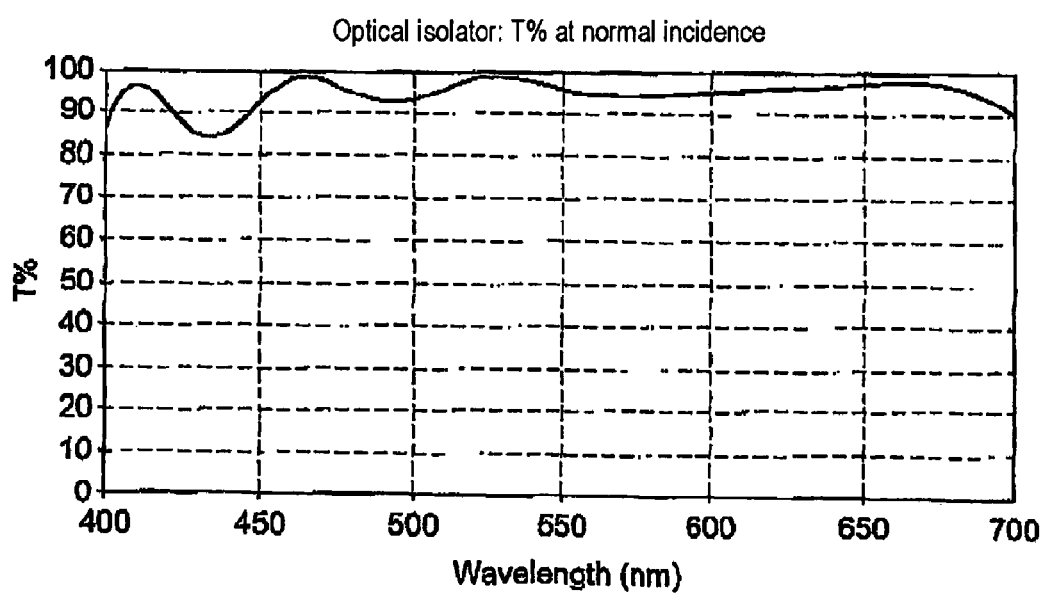
FIG. 6 is a graph showing the spectral transmission of an isolator insert forming part of a lens, transmission being plotted as a function of wavelength.

With the same stack, spectral transmission $T(i_r)\lambda$ is obtained that leads to a value for $\tau v$ greater than 90%, as shown by the graph of FIG. 6.

In this embodiment, "MR8" is used as the material constituting the optical insert and the lens.

| Layer | Material | Index | Thickness (nm) |
|---|---|---|---|
| 1 | $ZrO_2$ | 2.00378 | 78.56 |
| 2 | $SiO_2$ | 1.47409 | 146.23 |
| 3 | $ZrO_2$ | 2.00378 | 85.71 |
| 4 | $SiO_2$ | 1.47409 | 170.15 |
| 5 | $ZrO_2$ | 2.00378 | 120.65 |
| 6 | $SiO_2$ | 1.47409 | 298.79 |
| 7 | $ZrO_2$ | 2.00378 | 13.43 |
| 8 | $SiO_2$ | 1.47409 | 16.68 |
| 9 | $ZrO_2$ | 2.00378 | 138.39 |

Furthermore, by means of the invention, the wearer's eyesight can be corrected as needed by the wearer both for the information image I and for the image E of the surroundings.

In FIG. 4, the wearer's vision of the surroundings E is corrected by the ophthalmic lens or glass 3 and by the combination of the front and rear faces 1 and 2 of said lens.

For a single-focus lens, the power of the glass corresponds to the correction required by the wearer and is equal to the sum of the power provided by the front face 1 plus the power provided by the rear face 2. It is independent of the direction in which the wearer is looking, i.e. of the portion of the glass through which the scene is seen.

The following approximate equations apply, ignoring the thickness of the lens. The exact equations can be obtained using Gullstrand's equations as are known to the person skilled in the art.

$$P(\text{correction})=P(\text{front face 1})+P(\text{rear face 2})$$

with $P(\text{front face 1})=(n-1)/R1$ where n is the refractive index of the glass and R1 is the radius of curvature of the front face 1, and $$P(\text{rear face 2})=(1-n)/R2$$

where n is the refractive index of the glass and R2 is the radius of curvature of the rear face 2.

The information image I is corrected by adjusting the focusing of the image on the light beam generator system 7. Since the information light path does not pass through the front face 1 of the glass, the optical correction available on the path of the information imaging is equal only to the power of the rear face 2: it therefore does not correspond to the vision correction prescribed for the wearer. It is therefore appropriate to compensate for the lack of correction by changing the focusing of the generator system 7. This compensation should be equal to the power provided by the front face 1.

With a progressive lens, the vision correction provided by the glass depends on the observation direction, i.e. the portion of the glass through which the wearer sees a given scene. The correction power can therefore be written in the same manner as above, but locally for a given observation direction. When compensating for the power to be given to the information image path, attention should be given to the power provided along the information viewing direction RI. The radii of curvature to be taken into consideration are those situated in the vicinity of the intersection between this viewing direction RI and the glass. Given the need to take location into account, the approximate equations for defining power remain identical:

$P(\text{correction}) = P(\text{front face } 1) + P(\text{rear face } 2)$ with $P(\text{front face } 1) = (n-1)/R1$ where n is the refractive index of the glass and R1 is the radius of curvature of the front face 1, in the vicinity of the viewing direction RI, and $P(\text{rear face } 2) = (1-n)/R2$ where n is the refractive index of the glass and R2 is the radius of curvature of the rear face 2, in the vicinity of the viewing direction RI.

Furthermore, because of its correction function, the ophthalmic lens 3 has an influence on the vergence where the imaging path presents the information image I to the wearer, because the image passes through the rear face 2 of the lens.

The ideal vergence is written Verg(ideal), and denotes the vergence in diopters D at which it is desired to display the information image I for a wearer whose vision is emmetropic (normal). It is the reciprocal of the algebraic distance in meters between the emmetrope eye of the wearer and the information virtual image. The algebraic direction is determined by the light propagation direction. If it is desired that the information image appears in front of the wearer, then the distance is negative.

For example, if it is desired to cause the information image I to appear at 1 meter (m) in front of the wearer's eye 4, as though the wearer were looking at a screen situated 1 m in front of the wearer, then the following ideal vergence is obtained:

$\text{Verg(ideal)} = -1D$

When the wearer is ametropic, vision needs to be corrected, particularly in terms of power.

This correction is provided for viewing surroundings by the lens 3 which possesses power equal to the correction needed by the wearer for the observation direction RI in question.

This approximate correction power is as follows:

$P(\text{correction}) = P(\text{front face } 1) + P(\text{rear face } 2)$

Thus, to enable the ametropic wearer to see the information image I properly under ideal conditions, it is necessary for the system constituted by the information imaging part and the lens 3 to provide this information image at a vergence such that:

$P(\text{information image}) = \text{Verg(ideal)} + P(\text{correction})$

Since the information imaging path does not pass through the front face 1, the power delivered by the lens to the information imaging path is only P(rear face 2).

If the vergence at which the optical system of the light beam generator system 7 coupled to the isolator insert 5 displays the information image I is written P(imager), it is then appropriate for delivering the image under good conditions to the wearer for the power P(imager) to be adjusted so that:

$P(\text{imager}) + P(\text{rear face } 2) = \text{Verg(ideal)} + P(\text{correction})$ $= \text{Verg(ideal)} + P(\text{face } 1) + P(\text{face } 2)$ The focusing of the light beam generator 7 must therefore be adjusted so that the optical system coupled to the isolator insert 5 displays the information image I with vergence equal to:

$P(\text{imager}) = \text{Verg(ideal)} + P(\text{front face } 1)$

For a wearer of given correction and a pair of front and rear surfaces 1 and 2 providing the correction for the wearer, the information lens must therefore satisfy the following two equations along the observation line RI:

$P(\text{correction}) = P(\text{front face } 1) + P(\text{rear face } 2)$ and $P(\text{imager}) = \text{Verg(ideal)} + P(\text{front face } 1)$ When astigmatism is corrected, that correction is preferably provided by the rear face 2 of the lens so as to make it possible simultaneously to correct that ametropia both for viewing the surroundings and for viewing the information image.

Figure 7:
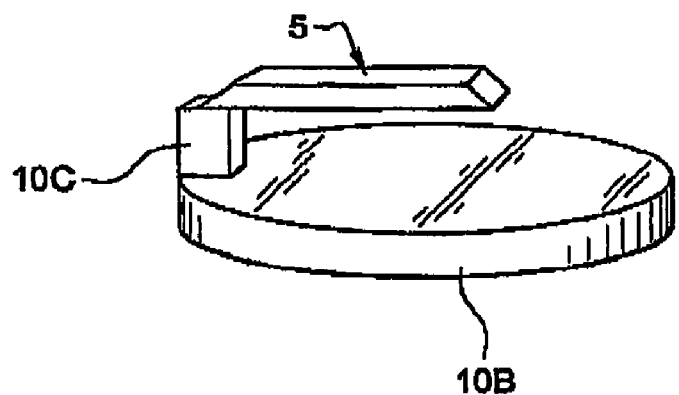
FIG. 7 is a perspective view showing the method in accordance with the invention for manufacturing the above-described lens.
Figure 8:
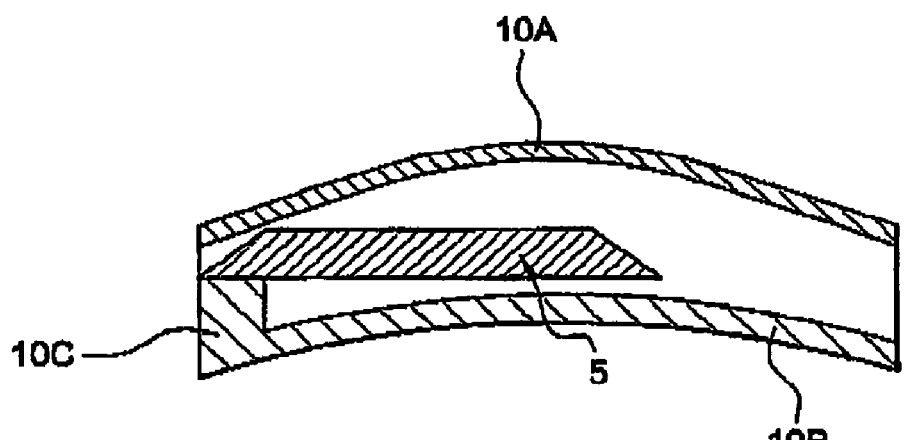
FIG. 8 is a vertical section view of a mold used in the manufacturing method of the invention.

With reference to FIGS. 7 to 8, there is shown the method of manufacturing such a lens in accordance with the invention.

As mentioned above, the insert 5 is totally contained within the lens 1. The mold for manufacturing the lens essentially comprises two mold portions, a first mold optical 10A for molding the front face 1 of the lens 3, and a second mold portion 10B for molding the rear face 2 of the lens.

The entry surface 6a through which the light beams emitted by the optical element of the light beam generation system are introduced is itself formed by making a molded cavity in the lens, with said surface constituting the bottom of the cavity.

This cavity is molded by means of a stud 10C secured to the second mold portion 10B, and preferably integral therewith, and the insert 5 is secured temporarily on the stud by adhesive prior to molding. The stud 10C is placed on a side edge of the second portion 10B.

Figure 9:
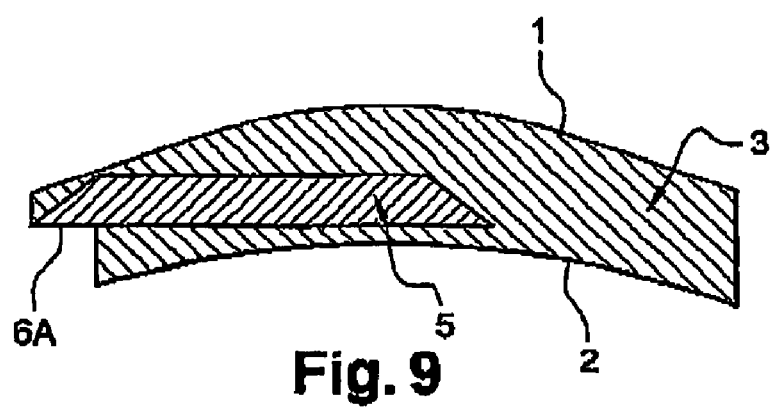
FIG. 9 is a longitudinal section view of a lens obtained by the manufacturing method of the invention.

Once the insert has been secured to the stud, as shown in FIG. 8, a monomer is cast and polymerized by heating in the mold and a lens as shown in FIG. 9 is obtained.

Most advantageously, the insert 5 is secured temporarily to the stud 10C prior to molding by means of a layer of the same monomer. As a result, the fine layer of monomer serving to bond the insert then acts after unmolding as a fine layer covering the insert at the entry surface 6a and presenting the same refractive index as the remainder of the lens 3.

The two mold portions 10A or 10B may be plane or curved depending on whether it is desired to manufacture a finished lens ready for positioning in a frame, or a lens blank, i.e. that needs to be subjected to at least one further treatment, e.g. surfacing, in order to be usable.

These mold portions may be made of metal, e.g. of X15 steel coated with a TiCN treatment to allow disassembly.

They may be of thermoplastic organic material, preferably of a material that does not adhere to the monomer resin used, e.g. polypropylene or TPX.

They may be of inorganic material with a coating constituted for example by a "top coat" or by an unmolding agent that can be added to the polymerizable resin.

Whatever the material used, the second mold portion 10B may include micromarking for positioning and identification purposes. Marked micro-circles are transferred onto the resulting lens in order to enable the insert 5 to be positioned in three dimensions and in order to ensure proper surfacing. Furthermore, the stud 10C is also marked so as to enable it the insert 5 to be properly positioned on its top surface.

By way of example, the monomer may be MR6. A fine layer of MR6UV can be used to bond the insert 5 on the stud 10C.

The surface of the stud 10C that is to receive the insert is coated in adhesive, advantageously MRMUV, and the insert is positioned on the stud by an appropriate tool as a function of the marking provided on the mold. The insert is pressed against the stud and held until the adhesive has polymerized. When using MR6, it is initiated with a particular photoinitiator that enables polymerization to take place quickly under UV radiation.

The invention claimed is:

1. A method of manufacturing a vision-correction lens that has a front face and a rear face, and into which light beams emitted by an optical element of a light beam generator system are introduced via an entry surface and directed towards the eye of the wearer to enable information content to be viewed, said light beams being reflected a plurality of times between two "reflection" faces between being introduced into the lens and exiting therefrom, said two reflection faces being faces of a transparent optical insert constructed with a light guide, said method comprising the step of placing said insert in said lens while it is being molded in a mold having a first mold portion for molding said front face, and a second mold portion for molding said rear face, and the insert is completely contained within the lens wherein said entry surface is formed by making a molded cavity in the lens, said entry surface constituting the bottom of said cavity and wherein said cavity is molded by means of a stud secured to the second mold portion and said insert is temporarily secured to said stud prior to molding.

2. A method according to claim 1, wherein said stud is placed on a lateral edge of said second portion.

3. A method according to claim 1, wherein said lens is obtained by molding a monomer.

4. A method according to claim 1, wherein said insert is secured temporarily to said stud prior to molding by means of a layer of said monomer.

5. A method according claim 1, wherein said second mold portion includes micromarking for positioning and identification purposes.

6. A finished lens ready for positioning on a frame, and obtained by means of the method according to claim 1.

7. A lens blank, requiring at least one treatment in order to be usable, obtained by means of the method according to claim 1.

8. An ophthalmic display including a correction lens according to claim 6.

9. An ophthalmic display including a correction lens according to claim 7.

* * * * *